United States Patent

[11] 3,587,803

[72] Inventors Hiroshi Sugiura;
Sakae Tsuge; Izumi Hosaka, Toyota; Kunio Kusunoki; Saburo Fujita, Kariya, Japan
[21] Appl. No. 839,453
[22] Filed July 7, 1969
[45] Patented June 28, 1971
[73] Assignees Toyoto Jidosha Kogyo Kabushiki Kaisha
Toyota, Japan;
Aisin Seika Kabushiki Kaisha
Kariya, Japan, fractional part interest to each
[32] Priority July 10, 1968
[33] Japan
[31] 43/58587

[54] CLUTCH DISC WITH WAVY SURFACES
3 Claims, 5 Drawing Figs.
[52] U.S. Cl. .................................................. 192/107C,
192/106.1, 267/165
[51] Int. Cl. ...................................................... F16d 13/69
[50] Field of Search ............................................ 192/107
(CP)

[56] References Cited
UNITED STATES PATENTS
| | | | |
|---|---|---|---|
| 2,110,051 | 3/1938 | Nutt et al. | 192/107CP |
| 2,195,665 | 4/1940 | Wolfram | 192/107CP |
| 2,307,006 | 12/1942 | Wemp | 192/107CP |
| 2,337,111 | 12/1943 | Joyce | 192/107CP |
| 3,241,644 | 3/1966 | Ridenour | 192/107CP |

Primary Examiner—Benjamin W. Wyche
Attorney—Pierce, Scheffler & Parker

ABSTRACT: A clutch disc, particularly for use on motor vehicles, comprises a circular array of wave-shaped leaf springs formed at the peripheral portion of the disc arranged between and secured to a pair of oppositely directed friction facings. The springs of two different types having, respectively, different axial depths alternate in succession around the disc and thereby impart a wave shape to the friction facings when the clutch disc is in an unloaded condition whereby a multistage engagement of the clutch is more easily accomplished.

CLUTCH DISC WITH WAVY SURFACES

SUMMARY OF THE INVENTION

This invention relates to improvements in clutch discs and more particularly to clutch discs of the cushion type for use in motor vehicles.

An object of the present invention is to provide a clutch disc in which the operation of clutch engagement is improved. More specifically the inventive idea is to prevent clutch chatter upon starting of the vehicle and to provide a smooth and gradual engagement of the driving and driven members.

Another object of this invention is to provide an improved clutch disc in which a semiengaged clutch condition that resides between a complete engaged and disengaged clutch condition can be easily obtained, and the rush out or break down of the motor vehicles upon starting can be prevented.

Still another object is to provide a clutch disc in which friction facings can be prevented from adhering to the flywheel or pressure plate, so that the trailing torque of the facings upon the clutch releasing is seriously diminished.

A further object of this invention is to provide an improved clutch disc in which the amount of the axial movement of the flywheel and the pressure plate can be more decreased than heretofore.

A still further object of this invention includes simplicity of construction and economy in manufacture.

According to the present invention, briefly summarized, there are provided two kinds of wave shaped leaf springs having respectively different axial depths which are arranged in alternation around the periphery of the disc between a pair of annular friction facings so that each facing has a waved surface when the clutch is released i.e. when the clutch disc is in an unloaded condition.

Other objects and the features of the invention will be more clearly apparent from the following detailed description with respect to examples of preferred embodiment of the invention when read in conjunction with the accompanying drawings.

DETAILED DESCRIPTION

Figure 2:
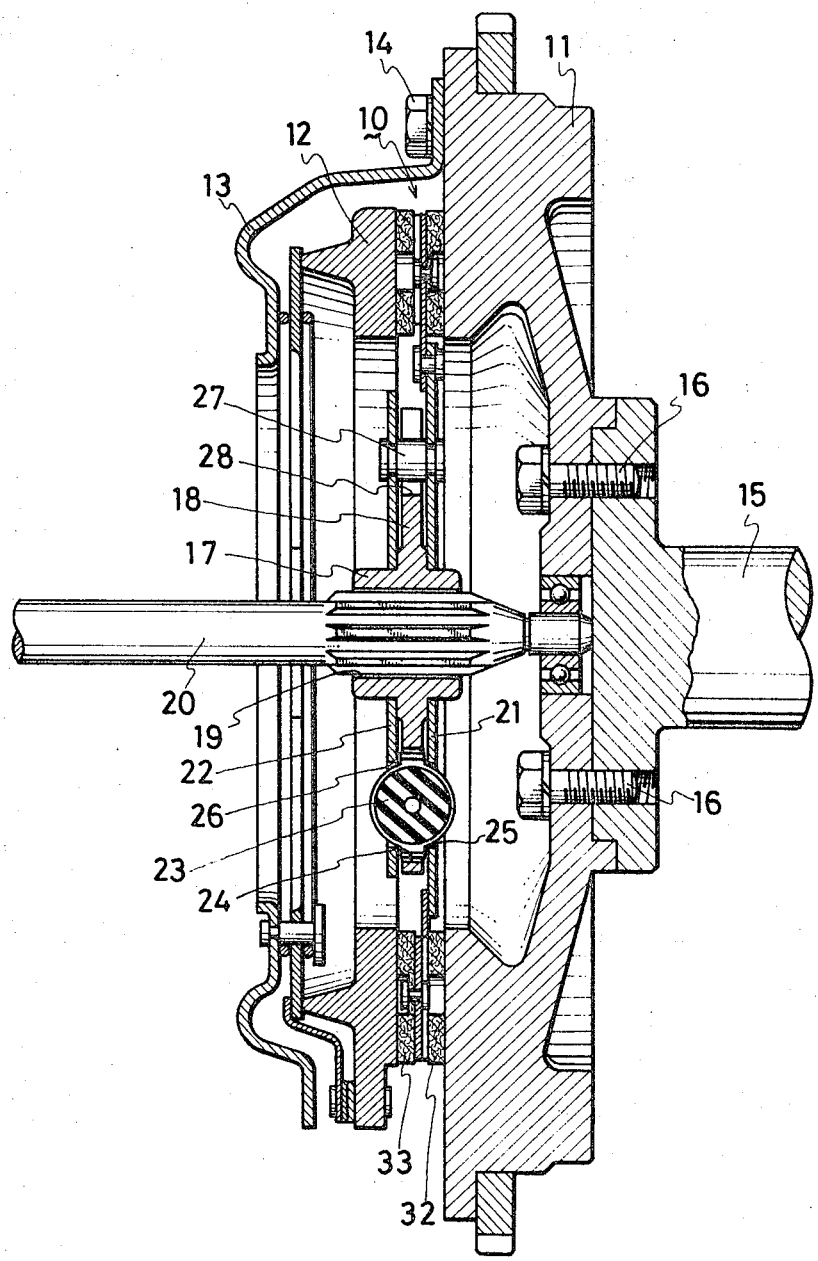
FIG. 2 is a section taken along the plane of line II–II of FIG. 1, the clutch being in the engaged position.

Referring to the drawings, especially FIG. 2 thereof, a clutch disc assembly 10 is arranged between a flywheel 11 and a pressure plate 12 drivingly mounted on a clutch cover 13. The flywheel 11 and the clutch cover 13 are rigidly connected to each other by fixing bolts 14 and rotate with an engine (not shown) through a crank shaft 15 rigidly mounted on the flywheel 11 by fixing bolts 16.

The clutch disc 10 comprises a hub 17 having a flange 18 extending radially outwardly therefrom, the hub 17 having therein a splined bore 19 whereby the clutch disc 10 is drivingly mounted on a transmission drive shaft 20 and is adapted for sliding movement longitudinally thereon.

At one side of the flange 18, there is provided a disc plate 21 which extends radially outwardly from the hub 17 to beyond the outer periphery of the flange 18 as shown in FIG. 2. At the other side of the flange 18, there is provided a side disc plate 22 extending outwardly from the hub 17 to adjacent the outer periphery of the flange 18.

There are some torsion dampers 23, four in this embodiment, for providing a flexible or yieldable driving connection between said disc plate 21 and said hub 17. Said dampers 23 made of such materials as rubbers, for example, are seated in openings 24 in the hub flange 18 and also in openings 25, 26 in the disc plate 21 and sideplate 22, respectively. Both the plate 21 and sideplate 22 are connected to each other by a plurality of stopper pins 27 which are positioned in recesses 28 of said flange 18, thus the disc plate 21 and sideplate 22 are tied together for simultaneous movement, and maintained in parallel spaced relationship.

Figure 3:
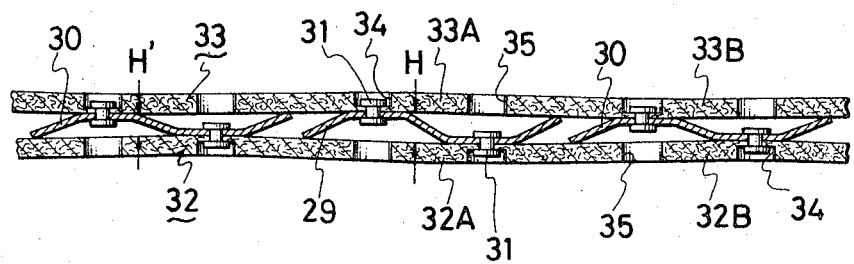
FIG. 3 is a sectional view taken along the plane of line III–III on FIG. 1.
Figure 4:
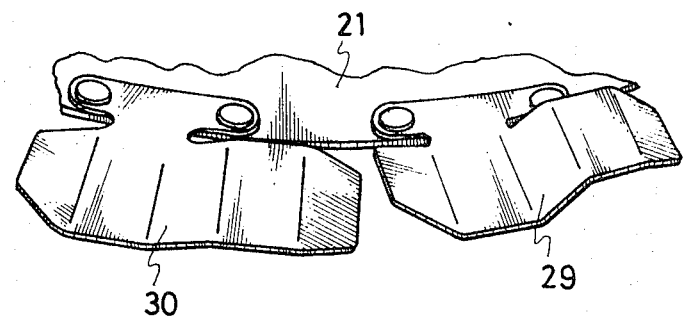
FIG. 4 is a perspective view of a portion of the clutch disc, showing especially the two kinds of the leaf springs.

At the outer periphery of said disc plate 21, there are connected a plurality of two kinds of lead springs 29 and 30 by means of rivets 31. Each leaf spring is of a generally rectangular shape, and is arranged alternately in spaced end-to-end order to provide approximately continuous annular cushion means between two facings 32 and 33. Said facings 32 and 33, which may be made from any suitable friction material, are adapted under clutch packing pressure to be packed between the flywheel 11 and the axially shiftable pressure plate 12 of the clutch assembly 10, each facing being provided with apertures 34 for the rivets 31 and the other apertures 35 as shown in FIG. 3; On the clutch engaging, the rivets 31 in said apertures 34 will project into the apertures 35. When the pressure plate 12 is released, these friction facings 32 and 33 are adapted to assume their normally spaced relationship with respect to each other.

The axial depth of each one of the leaf springs 29 is greater than that of the other leaf springs 30 which alternate with springs 29 as shown in FIG. 3; H indicates an axial depth of the spring 29, while H' indicates the axial depth of the other spring 30. H is greater than H'.

It is not necessary to make the leaf springs 29 and 30 with the same spring constant. The spring constants may be the same or different for the two types of springs.

The crests of the leaf springs 29 and 30 facing axially in one direction are secured by rivets 31 to the facing 32. The other crests thereof facing axially in the opposite direction; are secured by rivets 31 to the other facing 33. The difference of the axial depth between the alternating leaf springs 29 and 30 causes the surfaces of the facings 32 and 33 to be waved as shown in FIG. 3; The friction surfaces of facings 32 and 33 are convexly shaped at 32A and 33A, respectively, while being concavely shaped at 32B and 33B respectively.

Figure 1:
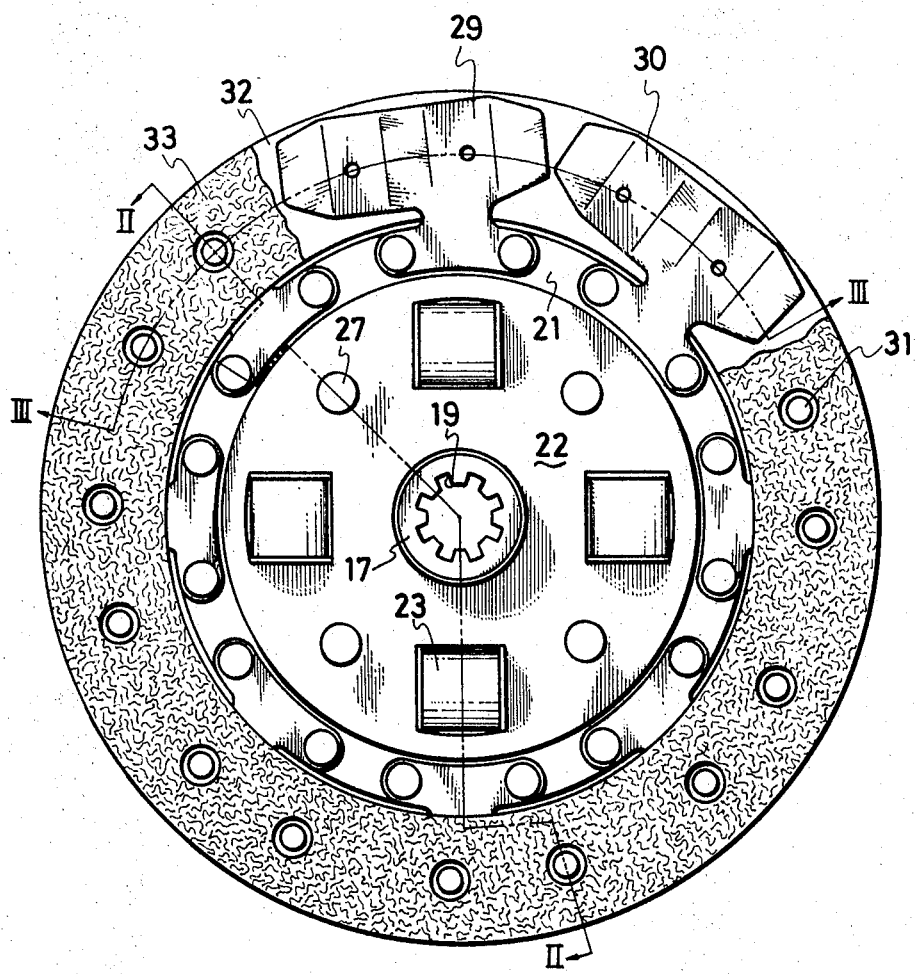
FIG. 1 is a fragmentary view in side elevation and partly broken away showing wave-shaped leaf springs constructed in accordance with this invention.
Figure 5:
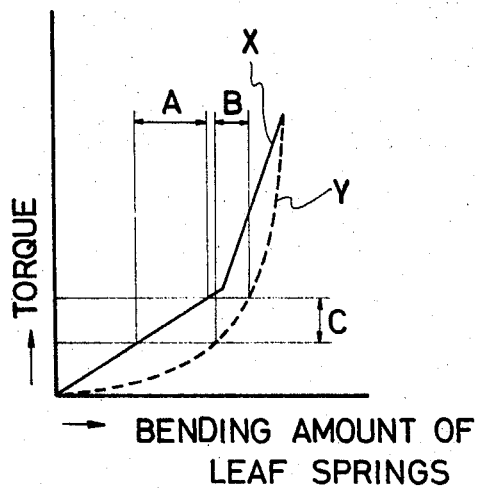
FIG. 5 is a diagram showing a cushioning character of the clutch disc according to this invention (X) and the conventional one (Y).

Upon initial engagement, at first the convex surfaces 32A of the facing 32 and the other convex surfaces 33A of the facing 33 engage with the flywheel 11 and pressure plate 12, respectively, thereby transmitting the engine torque from the crank shaft 15 to the main drive shaft 20 through the clutch disc assembly 10; consequently as is clearly shown in FIG. 5 the bending amount A of the leaf springs according to the present invention in the semiengaged clutch position C is larger than the amount B of the conventional one, and the rate of the torque change according to this invention is smaller than heretofore so that the semiengaged clutch operation can be easily obtained. Then said one concave surfaces 32B of the facing 32 and the other concave surfaces 33B of the facing 33, too, engage with said flywheel 11 and said pressure plate 12, respectively, thus all the surfaces of facings 32 and 33 are gradually engaged with the flywheel 11 and pressure plate 12 for multistage frictional engagement, whereby clutch slipping will be prevented.

These waved surfaces of the facings 32 and 33 prevent the friction facings 32 and 33 from adhering to the flywheel 11 or pressure plate 12, so that the trailing torque on the clutch releasing can be eliminated.

Moreover, the higher springs 29 are preloaded by the springs 30 so that the axial depth between both facings 29 and 30 is defined and the amount of the axial movement of the flywheel 11 and said pressure plate 12 is more decreased than heretofore.

It will be apparent without further description that the above-mentioned effect is achieved not only by the separate cushion means such as said leaf springs 29 and 30, but also by the spring means integral with the disc plate at the radially outward portion thereof.

We claim:

1. A clutch disc, particularly for use on motor vehicles comprising a circular array of wave-shaped leaf springs formed at the peripheral portion of the disc in circumferentially spaced relation and which are arranged between and secured to a pair of oppositely directed friction facings, said leaf springs being of two different types having respectively, different axial depths and alternating in succession around the disc thereby to impart a wave shape to the friction facings when said clutch disc is in an unloaded condition.

2. A clutch disc as defined in claim 1 wherein the wave-shaped leaf springs of both sets of springs have the same spring constant.

3. A clutch disc as defined in claim 1 wherein the wave-shaped leaf springs of one set of springs have a spring constant different from the wave-shaped leaf springs of the other set.